United States Patent [19]

Orser et al.

[11] 4,283,120
[45] Aug. 11, 1981

[54] LIGHT VALVE PROJECTION SYSTEM WITH OFF AXIS RASTER ORIENTATION

[75] Inventors: David A. Orser, Liverpool; Howard E. Towlson, Baldwinsville; Thomas T. True, Camillus, all of N.Y.

[73] Assignee: General Electric Company, Portsmouth, Va.

[21] Appl. No.: 968,270

[22] Filed: Dec. 11, 1978

[51] Int. Cl.$^3$ .............................. G02F 1/29
[52] U.S. Cl. .................................. 350/361
[58] Field of Search ........................ 350/361

[56] References Cited

U.S. PATENT DOCUMENTS

| 3,251,940 | 5/1966 | Roussin | 350/361 |
| 3,265,811 | 8/1966 | Ellis | 350/361 |
| 3,275,748 | 9/1966 | Knoll et al. | 350/361 |
| 3,489,940 | 1/1970 | Towlson | 350/361 |
| 3,489,941 | 1/1970 | Towlson | 350/361 |

OTHER PUBLICATIONS

Good, "A New Approach to Color Television Display and Color Selection Using a Sealed Light Valve", Proc. of Nat. Elect. Conf., vol. 24 (1968), pp. 771-774.

*Primary Examiner*—William L. Sikes
*Assistant Examiner*—Leon Scott, Jr.

[57] ABSTRACT

A light valve projection system in which information is impressed on a light modulating fluid overlaying a rotatable disk wherein incident light is modulated by said information and projected onto a viewing surface, said fluid including a raster upon which said information is written by the deposition of electric charge along scanning lines so as to form orthogonally related diffraction gratings which are parallel to a pair of coordinate axes in the plane of said disk. The raster is positioned on said disk offset from said coordinate axes so that movement of said fluid responsive to disk rotation is along paths that intersect said diffraction gratings, which is found to provide a more uniform fluid thickness and light transmission efficiency within the raster and to improve certain aspects of the projected information.

2 Claims, 3 Drawing Figures

LIGHT VALVE PROJECTION SYSTEM WITH OFF AXIS RASTER ORIENTATION

BACKGROUND OF THE INVENTION

The invention pertains to the field of light projection systems employing a deformable transparent light modulating medium which diffracts incident light to form projected images in accordance with the modulating information. More particularly, the invention relates to such systems in which the light modulating medium is a fluid overlying a rotating disk and information is written by an electron beam which scans a raster on the fluid and forms orthogonally related diffraction gratings which project superimposed information necessary for color projection, systems of this type having been commonly termed light valve projection systems. The diffraction gratings are composed of one set of gratings parallel to the scanning lines which contain green color information, and two sets of diffraction gratings orthogonal to said scanning lines containing red and blue color information.

Whereas light valve projection systems have been in commercial use for many years and are capable of providing high grade performance, numerous problems have existed with respect to these systems of differing degrees of importance. A number of these problems such as directed to the composition and processing of the fluid medium and overall light efficiency of the projected image have received substantially satisfactory solution. However, other difficulties have continued to plague workers in their efforts to further perfect the systems. One has been termed "burn-in" or after glow effects which result in a moire pattern of color, predominantly green, appearing within the projected picture ostensibly due to elemental portions of the diffraction gratings remaining for an inordinate length of time. Although this effect may not be readily visible in a full color image projection, tending to blend into the various colors of the image, it may become highly visible in alphanumeric displays and other forms of dark field projections.

Another problem includes nonuniformity in the fluid thickness within the raster which gives rise to nonuniformity in the efficiency of light transmission across the raster. One specific manifestation of this is a thickening of the fluid across one corner of the raster which is evidenced by a line appearing across a corresponding corner of the projected picture, termed "tailback". Another manifestation is a thinning of the fluid in a region at the bottom of the raster which results in reduced light transmission efficiency or picture brightness and, together with excess substrate deposit that also tends to occur in this region, may ultimately result in a curved line across a corresponding region of the picture. This phenomenon is called "necklace" effect.

In addition there is a condition known as "red field flutter" which is manifested by a flashing of light intensity principally in the red field. This effect is believed to result primarily from partial cancellation of the extremely fine red diffraction gratings in response to a slightly discontinuous movement in disk rotation.

SUMMARY OF THE INVENTION

Accordingly, one object of the present invention is to provide a novel light valve projection system in which "burn-in" effects are significantly reduced or eliminated so as to achieve an improved picture display in general and particularly with respect to dark field display applications.

Another object of the invention is to provide a novel light valve projection system having a more uniform thickness of the fluid medium across the raster for generally obtaining more uniform light transmission efficiency at the optimum value.

Another object of the invention is to provide a novel light valve projection system in which "tailback" and "necklace" effects are significantly reduced or eliminated.

A further object of the invention is to provide a novel light valve projection system in which "red field flutter" effects are significantly reduced or eliminated.

Yet a further object of the invention is to provide a novel light value projection apparatus of increased lifetime expectancy.

Briefly, these and other objects of the invention are accomplished in a light valve projection apparatus in which orthogonally related light diffraction gratings are impressed on a light modulating fluid to diffract incident light for projection of information onto a viewing surface, said apparatus including a rotatable disk mounted within a housing and havings its lower portion immersed in a sump which holds the light modulating fluid so that said fluid covers over at least one surface of the disk during rotation. The light modulating fluid includes a stationary raster in the upper portion of said disk upon which electric charge from an electron gun is deposited along scanning lines in a given linear direction to form a first set of diffraction gratings parallel to said scanning lines and second and third sets of diffraction gratings which are orthogonal to said scanning lines. The orthogonally related gratings are parallel to first and second coordinate axes in the plane of the disk which intersect at the rotational center of the disk so as to divide its upper portion into first and second quadrants, the disk rotating in a direction from said first to said second quadrant. In accordance with the invention, said raster is positioned on said disk offset from said coordinate axes within a band bounded by the circular paths of first and second radii in the plane of said disk so that circular paths described by radii intermediate said first and second radii intersect said first, second and third sets of diffraction gratings at substantially every elemental area of said raster, whereby no grating is at any point tangent to movement of the fluid. In accordance with a more specific aspect of the invention said raster is a rectangle having its larger dimension, which is along the first axis, approximately 4/3 its smaller dimension and on the order of the radius to its center, the raster being positioned on the disk in said first quadrant with the radius to the center of the raster making an angle with the second axis in the range of between approximately 35° and 60°.

BRIEF DESCRIPTION OF THE DRAWINGS

While the specification concludes with the claims which particularly point out and distinctly claim that subject matter which is regarded as inventive, it is believed the invention will be more clearly understood when considering the following detailed description taken in connection with the accompanying figures of the drawings, in which:

DESCRIPTION OF A PREFERRED EMBODIMENT

Figure 1:
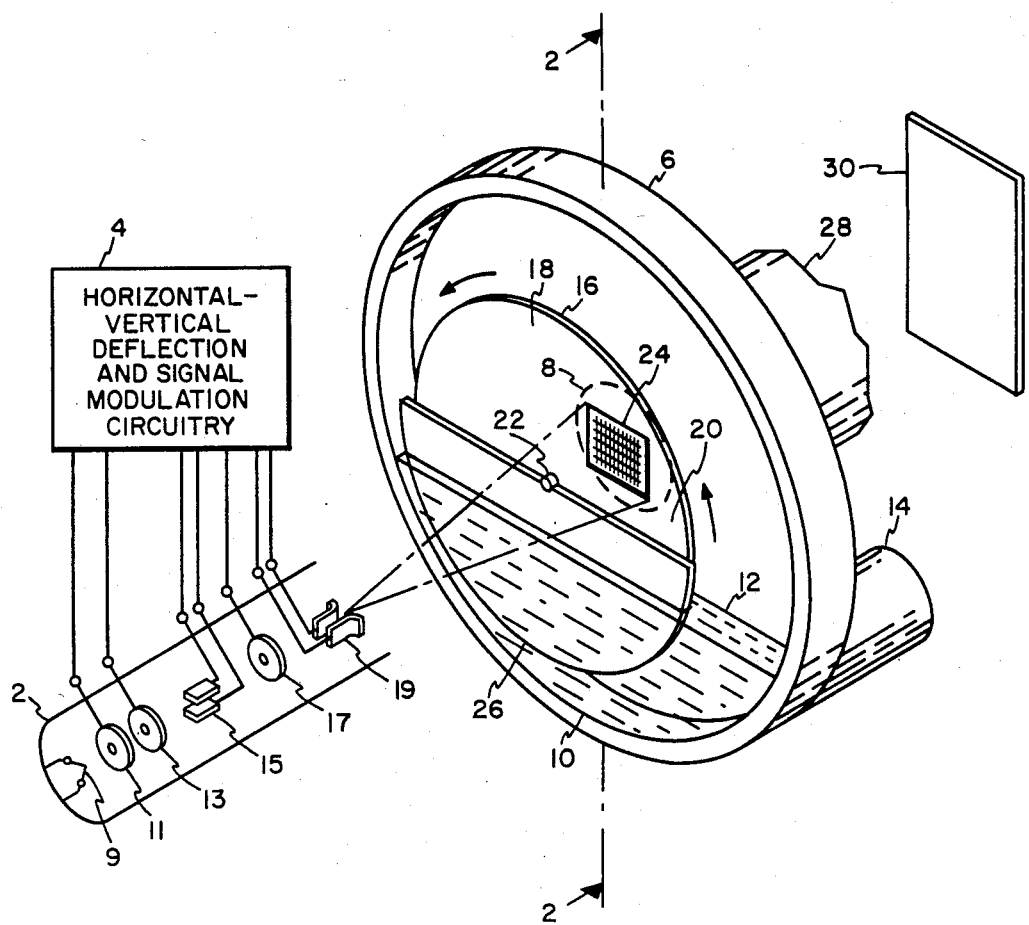
FIG. 1 is a schematic diagram of a portion of the light valve projection system in accordance with the present invention, including the electron beam means and tube faceplate, shown in perspective view.

Referring to FIG. 1, there is schematically illustrated a portion of a light valve projection apparatus, including an electron gun structure 2, the electron beam of which is controlled by horizontal-vertical deflection and signal modulation circuitry, shown as block 4, and the faceplate 6 of the envelope or housing of the apparatus. The faceplate is typically of glass containing a light output window 8 and a sump region 10 which holds a reservoir of light modulating fluid 12. The light modulating fluid is typically a polybenzyltoluene oil having a fluid viscosity of 1,000 centistokes at 60° C. and a vapor pressure of $10^{-9}$ to $10^{-10}$ torr. A rotatable disk member 16 with a thin conductive coating 18 on one surface 20 has its lower portion immersed in the fluid and is rotated around its center 22 in a direction shown by the arrow with the result that the fluid is dragged along by the disk and covers the surface 20, the fluid adhering to the surface so that elemental portions of the fluid follow circular paths described by the disk rotation. A raster 24, composed of orthogonally related diffraction gratings, is formed on the surface 20 by scanning of the electron beam. Disk 16 is normally rotated at about 3 rotations per hour by a conventional drive mechanism, not shown. The raster is continuously replenished with fresh fluid to prevent rapid polymerization of the fluid by bombardment of the electron beam, the fluid being pumped by a pump 14, filtered and introduced into a narrow region of the sump between a baffle member 26 and the disk. Further details in the manner of coating the disk surface with a light modulating fluid are presented in U.S. Pat. No. 3,489,940, issued Jan. 13, 1970 to H. E. Towlson.

The raster 24, in the present discussion, is the area of the fluid that is scanned by the electron beam. Although the disk and fluid are in constant circular motion, the raster is stationary with respect to the faceplate 6 and output window 8 so that images formed on the raster by the electron beam through the deformable mechanism of the fluid can be projected by suitable optical elements, only the output portion of which are represented by member 28, onto a viewing surface 30. As shown more clearly in the cross sectional view of the faceplate in FIG. 2 and the diagram of FIG. 3, in accordance with the invention the raster is uniquely positioned on the rotating disk between a first coordinate axis 32 and a second coordinate axis 34, which in a normal alignment of the projection apparatus correspond to the horizontal and vertical axes, respectively. In this position, which is within a band bounded by the circular paths 31 and 33 of radii 35 and 37, respectively, shown in FIG. 2, the circular paths of all radii between radii 35 and 37, which are followed by the fluid, cut across or intersect the orthogonally arranged diffraction gratings at substantially every elemental area of the raster, whereby no grating is at any point tangent to movement of the fluid. This results in significant improvement in the operation of the fluid and in the projected image quality as compared to the fluid operation and image quality when the raster is in the conventional position centered on the vertical axis. More specifically, and as will be discussed in detail when considering FIGS. 2 and 3, the invention provides a more uniform fluid thickness throughout the raster, the elimination or significant reduction of "burn in", "necklace", "tailback" and "red field flutter" effects, and contributes to an increased lifetime expectancy of the projection apparatus by providing a more equal distribution of energy over the raster from the deposited electric charge.

To better understand the invention, it is desirable to briefly describe the operation of the light valve projection system of the type illustrated in FIG. 1. A more detailed description of the system can be found in a publication of the Proceedings of the National Electronics Conference Volume XXIV, 1968 entitled "A New Approach to Color Television Display and Color Selection Using a Sealed Light Valve" by W. E. Good. The electron beam is formed and controlled by the cathode 9, control electrode 11, anode 13, vertical deflection plates 15, focus electrode 17, horizontal deflection plates 19 and deflection and modulation circuitry 4 to deposit charge along horizontal scanning lines which deforms the surface of the fluid to form orthogonally arranged light diffraction gratings. The depth of the gratings is a function of signal modulation and determines the brightness of projected picture elements. A first color signal, namely green, is a VHF signal added to the vertical deflection voltage to "wobbulate" the beam, which is a kind of vertical defocussing of the beam spot, thus controlling a first set of diffraction gratings formed by the scanning lines. Second and third color signals namely red and blue, are VHF signals of different frequency that velocity modulate the beam spot by being applied to the horizontal deflection voltage for causing the beam to speed up and slow down and thereby form second and third sets of superimposed diffraction gratings that are orthogonal to the scanning lines. By means of a schlieren optical system, of which the output portion 28 appears in FIG. 1, transmitted light incident upon the raster is diffracted at its elemental areas by the orthogonal diffraction gratings to form a projected image in accordance with the color information contained in the gratings.

Figure 2:
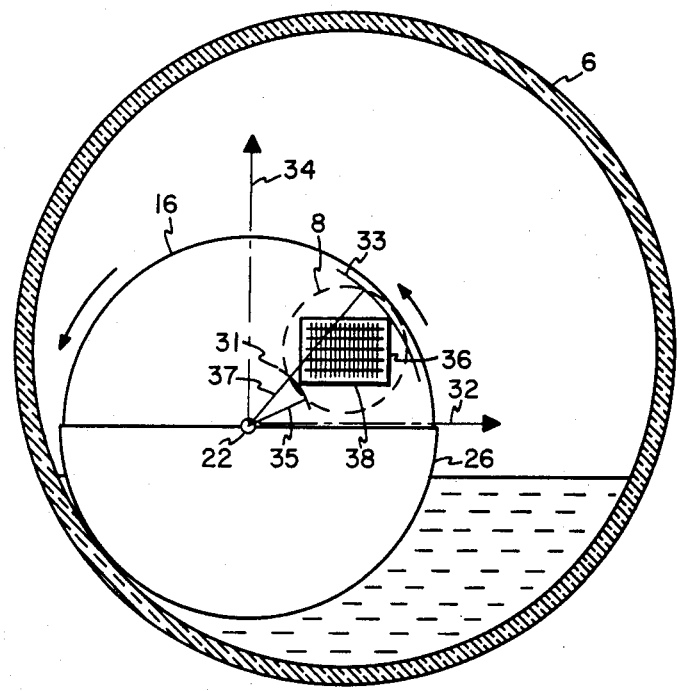
FIG. 2 is a cross sectional view of the faceplate taken along the line 2—2 in FIG. 1.
Figure 3:
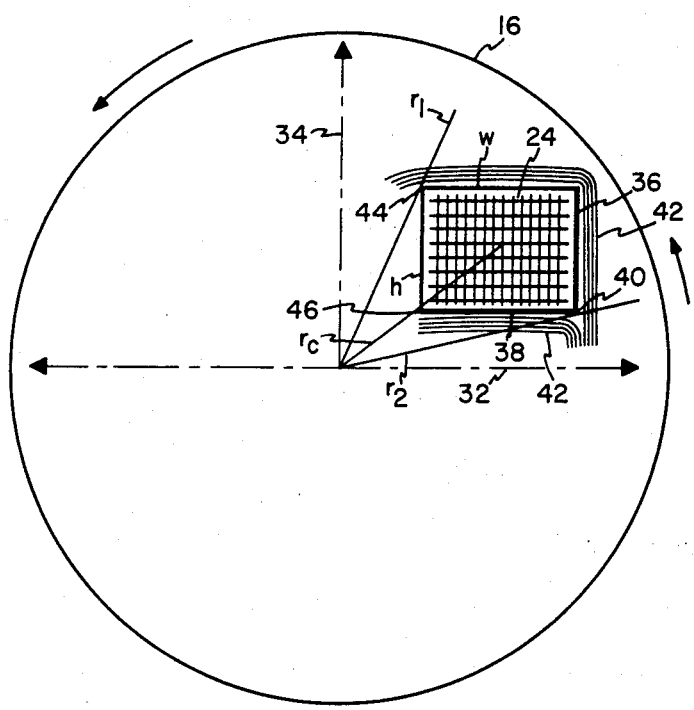
FIG. 3 is a diagram useful in explaining the invention.

To obtain good quality projected images with high efficiency light transmission it is necessary to provide a layer of fluid that is of an optimum thickness and good uniformity throughout the raster area. A preferable thickness is typically 11 microns uniform to within 10% to 20% across the raster. As the disk 16 rotates and gathers up fluid which moves with the disc so that its elemental particles travel in circular paths, the fluid tends to have a thickness somewhat more than optimum which would cause a noisy background in the projected image. As shown in FIGS. 2 and 3, an electron dam is created at the leading edge 36 of the horizontal trace which serves to reduce the fluid level in the raster area. The dam effect is created by increasing the charge density at the horizontal trace leading edge which can be readily accomplished by modifying the horizontal blanking width with respect to the turn around time of the horizontal deflection voltage so as to cause the beam to reside for a longer time at the trace leading edge. A more detailed description of creating an electron dam at the horizontal trace leading edge is provided in U.S. Pat. No. 3,155,871 issued Nov. 3, 1964 to W. E. Good et al.

For purposes of explanation, coordinate axes 32 and 34 are shown in FIGS. 2 and 3 to divide the upper portion of disk 16 into first and second quadrants, where disk rotation is in a direction from the first quadrant to the second quadrant. By orienting the raster to be offset from the coordinate axes within the quadrant that is on the input side of fluid travel, defined here as the first quadrant, and by suitably adjusting the electron dam effect to obtain the desired thickness of fluid in the raster area, there results a significantly more uniform fluid thickness within the raster as compared to fluid conditions for the conventional raster position on the vertical axis. Thus, uniformity to within 1½ microns have been achieved which is two times that achieved by the conventional raster. The improvement in uniformity is believed to be brought about due to the combined action of the electron dam at the leading edge 36 of horizontal trace and the natural damming action at the leading edge 38 of vertical trace which is provided by electric charge along the horizontal scanning lines adjacent to this edge. The combined damming action at edges 36 and 38 causes excess fluid as it approaches the raster to move evenly to either side of the raster corner 40 formed by these boundaries, as diagrammatically illustrated by the fluid travel lines 42 in FIG. 3, while fluid within the raster continues along the noted circular travel paths. Further, excess fluid is caused to flow substantially past the opposite corner 44 before gravitational effects move it in a downward direction.

In addition to achieving a more uniform light transmission efficiency across the raster in general as the result of greater uniformity of fluid thickness, "tailback" and "necklace" effects are also significantly reduced or eliminated by the present invention. "Tailback" is a condition of different fluid thickness in the region of the trailing edge corner 44 believed to be due to gravitational effects in pulling the thick fluid above the raster downward into the trailing edge corner. It results in a curved line due to a sharp gradient in fluid thickness. In the described offset axis position of the raster within the first quadrant, most of the downward flow of excess fluid occurs beyond the trailing edge corner.

"Necklace" is a region of reduced fluid thickness and excess substrate deposit extending from corner 40 to corner 46 of the raster and of curved outline primarily following the path of the fluid in this region when the raster is in the conventional position. It is manifested by a reduced projected image brightness during early light valve life. During later life it progressively becomes a dark region due to deposit formations of fluid degradation products and other materials on the substrate supporting the fluid, which are contributing factors in limiting the life of the light valve projection apparatus. The mechanism for excess substrate deposit in the necklace region is a disproprtionate concentration in this region of energy applied to the fluid by deposited charge, energy being a function of charge magnitude and residence time under the electron beam of the fluid traversing the raster. The off axis orientation of the raster as herein described provides a more equal energy distribution over the raster by more evenly equating the fluid residence time under the beam throughout the various portions of the raster. Accordingly, the off axis raster position, in addition to removing the early effects of "necklace", contributes to increasing light valve life expectancy.

Off axis orientation of the raster is also found to significantly reduce or eliminate "burn-in" or after glow effects. In conventional rasters these effects occur with respect to the green color information and appear in the projected image as a moire pattern running vertically in the central region of the image. It is believed to be the result of fluid travel paths, which follow disk rotation, becoming tangent to the beam scan, which is parallel to the green diffraction gratings, so that charge is repeatedly deposited on the same fluid element. This causes relatively rapid polymerization of fluid molecules, a polarization of the fluid and an intensified surface charge in a given area. The end result is a persistent green moire pattern which is particularly noticeable in dark field projections. Off axis position—of the raster as described, so as to substantially incline the fluid travel paths with respect to the green diffraction gratings, and also with respect to the red and blue diffraction gratings, throughout the raster provides a highly satisfactory solution to the problem of "burn-in".

Another effect that is significantly overcome by the described offset raster is "red field flutter", which effect is due to a partial cancellation of the extremely fine red diffraction gratings to produce a flashing of light intensity in the red field. The effect is considered to result from small discontinuities or skip in disk rotation, on the order of the diffraction grating spacing, and is of greatest consequence when the fluid travel path is normal to the gratings and the angular velocity component of disk rotation in this direction is maximum. Offsetting the raster so as to incline the travel paths of disk rotation with respect to the red diffraction gratings acts to reduce the angular velocity component of disk rotation in the offending direction, i.e., across the gratings, and reduces or eliminates the flutter effect.

By convention, the raster has its larger dimension w along the horizontal axis 32 and its small dimension h along the vertical axis 34, w being equal to 4/3 h. In the embodiment under consideration w equals 1.10 inches, h equals 0.825 inches, and the radius $r_c$ to the center of the raster equals 1.288 inches. It is found that the optimum improvement in thickness uniformity and fluid operation with respect to the various effects herein considered, is provided by orienting the raster within what has been defined as the first quadrant where the radius $r_c$ makes an angle with the vertical axis in the range of approximately 35° to 60°. This corresponds to a pie section of the disk within this quadrant that is bounded by a pair of radial lines, such as lines $r_1$ and $r_2$ extending to either extreme corner 40 and 44 of the raster in FIG. 3, making an angle with the vertical axis of approximately 10° and 80°, respectively. Raster areas of other than the indicated width and height dimensions and of other center radii which are enclosed by these boundaries can be expected to obtain corresponding improvement in fluid thickness uniformity and fluid operation.

Although the invention has been described with respect to a specific embodiment for complete and clear disclosure, the appended claims are not to be thus limited but are to be construed as embodying all modifications and alternative constructions that may occur to one skilled in the art which fairly fall within the basic teaching herein set forth.

What we claim as new and desire to secure by Letters Patent of the United States is:

1. Light valve projection apparatus including electron beam means forming a raster of orthogonally related diffraction gratings on a light modulating fluid to diffract incident light for projection onto a viewing surface, comprising:

a housing providing a sump for said fluid, a disk rotatably mounted within said housing so as to rotate about its center, said disk having a portion immersed in said sump so that said fluid coats the nonimmersed portion of at least one surface of said disk upon rotation thereof, means for directing said electron beam means to form on the fluid coating of said disk a raster of deposited charge along parallel scanning lines in a first direction to form a first set of diffraction gratings and at least a second set of diffraction gratings orthogonal to said first set, said means for directing said electron beam means causing said raster to be positioned on the nonimmersed portion of said disk between the offset from horizontal and vertical coordinate axes in the plane of said disk, said coordinate axes intersecting at the rotational center of said disk so as to divide said nonimmersed portion into first and second quadrants, said first set of diffraction gratings being substantially parallel to said horizontal coordinate axis, whereby the concentric generally circular paths traced by elemental portions of said fluid as said disk rotates intersect each of said sets of diffraction gratings and are not tangent to any of said sets of diffraction gratings.

2. Light valve projection apparatus as recited in claim 1 wherein said raster is a rectangle having its larger dimension parallel to said horizontal axis, said raster being positioned in the first quadrant of said disk with the radius to the center of the raster making an angle with said vertical axis in the range of between approximately 35° and 60°.

* * * * *